(12) United States Patent
Maeso et al.

(10) Patent No.: US 10,509,141 B2
(45) Date of Patent: Dec. 17, 2019

(54) METHOD AND APPARATUS FOR DETERMINING A FRACTURE APERTURE IN A WELLBORE

(71) Applicant: SCHLUMBERGER TECHNOLOGY CORPORATION, Houston, TX (US)

(72) Inventors: Carlos Maeso, Clamart (FR); Isabelle Dubourg, Clamart (FR); Daniel Quesada, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 483 days.

(21) Appl. No.: 15/234,380

(22) Filed: Aug. 11, 2016

(65) Prior Publication Data

US 2017/0052272 A1 Feb. 23, 2017

(30) Foreign Application Priority Data

Aug. 17, 2015 (EP) .................................... 15290204

(51) Int. Cl.
| | |
|---|---|
| *G01V 3/20* | (2006.01) |
| *G01V 99/00* | (2009.01) |
| *E21B 47/00* | (2012.01) |
| *G01V 3/24* | (2006.01) |
| *G01V 3/30* | (2006.01) |

(52) U.S. Cl.
CPC ............ *G01V 3/20* (2013.01); *E21B 47/0002* (2013.01); *G01V 3/24* (2013.01); *G01V 3/30* (2013.01); *G01V 99/005* (2013.01)

(58) Field of Classification Search
CPC ... G01V 3/20; G01V 3/30; G01V 3/24; G01V 99/005; E21B 47/0002
See application file for complete search history.

(56) References Cited

U.S. PATENT DOCUMENTS

| | | | | |
|---|---|---|---|---|
| 5,243,521 A | * | 9/1993 | Luthi ....................... | G01V 3/20 702/11 |
| 7,577,527 B2 | * | 8/2009 | Vega Velasquez ...... | E21B 43/26 702/6 |
| 8,393,411 B2 | * | 3/2013 | Dupriest .................. | C09K 8/03 175/40 |

(Continued)

OTHER PUBLICATIONS

Qiming Li et. al., Automated Interpretation for LWD Propagation Resistivity Tools Through Integrated Model Selection, Jan.-Feb. 2004, Petrophysics, vol. 45, No. 1, pp. 14-26 (Year: 2004).*

(Continued)

*Primary Examiner* — Aniss Chad

(57) ABSTRACT

A method for determining a fracture aperture of a fracture aperture in a wellbore comprises measuring a resistivity of the wellbore with a downhole tool in a wellbore for obtaining an image of the wellbore. Based on the image, the method detects fractures in the wellbore, and calculates a fracture aperture of the detected fracture according to a predetermined model of the wellbore set up based on hypothesis relative to the configuration of the wellbore. Then, the method estimates a correction to the predetermined model when at least one of the hypothesis is not met, and determines an uncertainty range for the fracture aperture also using a measured parameter.

17 Claims, 11 Drawing Sheets

(56) References Cited

U.S. PATENT DOCUMENTS

| | | | | |
|---|---|---|---|---|
| 8,489,375 | B2* | 7/2013 | Omeragic | G01V 11/00 |
| | | | | 703/10 |
| 8,521,494 | B2* | 8/2013 | Narr | G06F 17/5018 |
| | | | | 702/6 |
| 9,176,245 | B2* | 11/2015 | Craig | G01V 1/282 |
| 9,803,475 | B2* | 10/2017 | Shahri | E21B 49/006 |
| 9,863,240 | B2* | 1/2018 | Geehan | E21B 43/26 |
| 2011/0091078 | A1 | 4/2011 | Kherroubi et al. | |
| 2014/0100786 | A1* | 4/2014 | Ma | G01V 1/288 |
| | | | | 702/16 |
| 2014/0372094 | A1* | 12/2014 | Holland | G01V 11/00 |
| | | | | 703/10 |
| 2015/0057934 | A1* | 2/2015 | Ma | E21B 43/16 |
| | | | | 702/11 |
| 2017/0343689 | A1* | 11/2017 | Dykstra | E21B 43/26 |

OTHER PUBLICATIONS

William C. Lyons, Working Guide to Drilling Operations, Elsevier: Boston 2010, p. 55 (Year: 2010).*

Luthi, S.M. And Souhaité, P.—"Fracture Apertures From Electrical Borehole Scans." Geophysics 55, 1990., pp. 821-833.

* cited by examiner

US 10,509,141 B2

METHOD AND APPARATUS FOR DETERMINING A FRACTURE APERTURE IN A WELLBORE

CROSS-REFERENCE TO RELATED APPLICATIONS

The present application claims priority to EP Application Serial No. 15290204.5, which was filed on 17 Aug. 2015, and is incorporated herein by reference in its entirety.

The disclosure relates to a method and apparatus for determining a fracture aperture in a wellbore.

BACKGROUND

Natural fractures are common in both reservoir and non-reservoir rocks. The quantification of the fracture properties is a key step in the development of reservoirs containing fractures. This quantification includes orientation, distribution (or density) and the openness (or aperture) of the fractures. One of the most common techniques for understanding the distribution and properties of fractures is to use electrical images of the borehole. The responses of fractures on electrical borehole imaging tools have been recognized since soon after the introduction of the early imaging tools in the 1990's. In the case of open fractures, and a normal overbalanced drilling condition with water base mud, the fractures appear conductive. The excess conductivity (or more correctly excess current flow) relative to the background response has a close relationship with the aperture of the fracture. Work published in 1990 by Luthi and Souhaité (Luthi, S. M. and Souhaité, P. "Fracture Apertures From Electrical Borehole Scans." Geophysics 55, 1990. 821-833) demonstrated a relationship between the aperture of the fracture and a function of the excess current caused by the fracture, the background resistivity of the rock and the resistivity of the fluid filling the rock. This is expressed as an equation (commonly known as the Luthi-Souhaité equation):

$$W = c \cdot A \cdot R_m^b \cdot R_{xo}^{1-b} \quad (1)$$

Where:
W=fracture aperture (mm);
A=excess current (μA mm/V);
$R_m$=mud resistivity (ohm·m);
$R_{xo}$=background formation resistivity (ohm·m);
b and c are parameters relative to the tool.

Equation (1) is widely used for the calculation of the apertures of fractures. It is based on hypothesis relative to the formation or the tool, such as the following:

The response on the image log is due to a single fracture.
Fractures are perpendicular to the wellbore.
Fractures are of infinite length and constant width.
Fractures are filled with one fluid of known resistivity, whole mud resistivity (Rm) by default.
Scaling of imaging tool response to resistivity is valid.
Matrix is of uniform material.
Invasion from the fracture wall is insignificant.

In view of the above, the confidence levels associated with the calculated outputs of the Equation (1) vary from one well to another or even to one zone of the well to another.

SUMMARY

The disclosure relates to a method for determining a fracture aperture of at least a fracture in a wellbore, comprising:

Measuring resistivity with a downhole tool in a wellbore for obtaining an image of the wellbore,
Detecting at least a fracture in the wellbore
Calculating a fracture aperture of the detected fracture according to a predetermined model of the borehole, the model being set up based on at least an hypothesis relative to the configuration of the wellbore,
Estimating a correction to the predetermined model when at least one of the hypotheses are not met,
Based on at least a measured parameter relative to the wellbore and on the correction, determining an uncertainty range for the fracture aperture.

As the uncertainty range is determined for the fracture in the wellbore, it is possible to determine on which fracture data it may be relied upon for performing further analysis or which fracture data may be considered as qualitative only and knowledge of the wellbore may be enhanced:

The disclosure also relates to a corresponding apparatus.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As set forth above, the disclosure relates to a method for determining a fracture aperture of at least a fracture in a wellbore.

Figure 1:
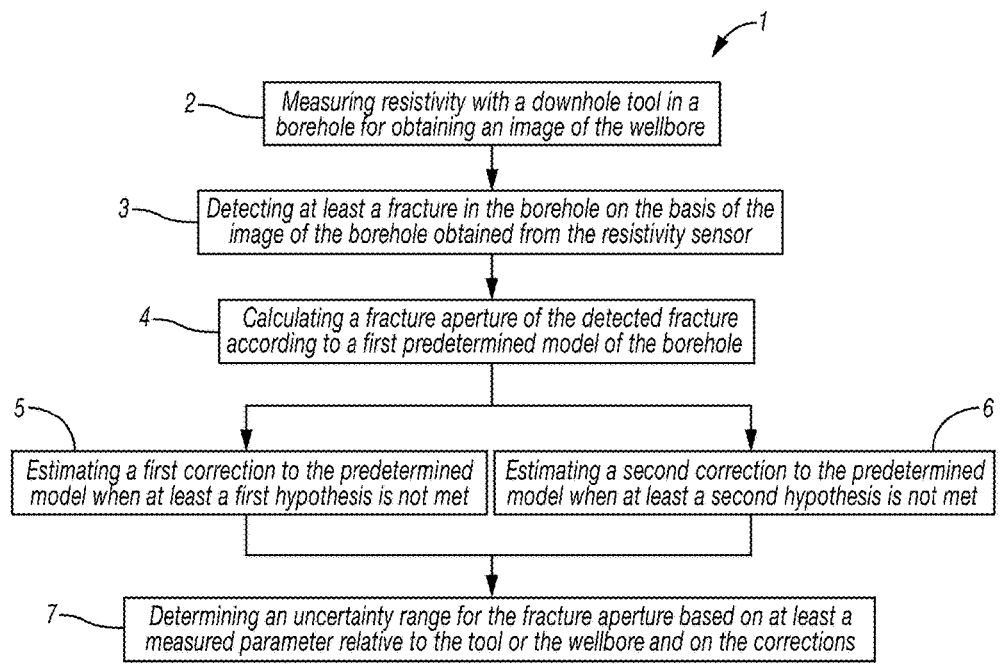
FIG. 1 is a flowchart of a method according to one or more aspects of the present disclosure.

FIG. 1 illustrates a method according to an embodiment of the disclosure. First, the method 1 comprises measuring resistivity with a downhole tool in a borehole for obtaining an image of the wellbore (box 2). The imaging of the wellbore is obtained via known techniques that the one of ordinary skill is familiar with and that will not be explained in further details here. The downhole tool may comprise a resistivity sensor. It may be a LWD (logging while drilling) tool measuring while the well is drilled or a wireline tool that is lowered in the wellbore after the well has been drilled, for instance. An example of a system comprising a wireline tool or a LWD tool will be described respectively at FIGS. 2 and 3.

Then, the method 1 comprises detecting at least a fracture in the borehole on the basis of the image of the borehole obtained from the resistivity sensor (box 3) and calculating a fracture aperture of the detected fracture according to a first predetermined model of the borehole (box 4). The model may be the Luthi-Souhaité model and the calculation may be obtained by applying the Equation (1) to the wellbore in view of the parameters relative to the wellbore obtained from the resistivity sensor and, if necessary, from other sensors. As already explained, the Luthi-Souhaité model is based on multiple hypothesis relative to the configuration of the wellbore that may or may not apply to the wellbore that is being investigated. The calculation may be performed by a processing system that will be detailed at FIG. 4 and that may be situated downhole or at the surface, at the wellsite or remote from the wellsite.

The method 1 may also comprise estimating a correction to the predetermined model when at least one of the hypotheses is not met (box 5 and 6). In particular, it may comprise several corrections of the model when different hypothesis are not met, performed in parallel or in series (here in parallel). These estimations are performed by the processing system of FIG. 4. Each estimation may be performed by the system once the calculation has been performed or may be a generic estimation stored in the system's memory. In this case, the estimation of the correction may be performed before the image of the wellbore is obtained. The correction of the model may be relative to the orientation of the fracture and/or the longitudinal extent of the fracture and/or to the fluid filling the fracture and/or to the scaling of the tool, etc. In the method of FIG. 1, two estimations are performed, but any number of estimations may be performed (one, three, four, five, etc.) depending on the hypothesis that are tested. One or more of the estimations may comprise modelling a response of the downhole tool when the hypothesis is not met. It may also comprise representing the uncertainty range associated with the hypothesis as a function of one or several parameters relative to the wellbore. One or more estimations may also comprise setting a maximal error for a variable of the model, optionally as a function of the configuration of the wellbore.

The method may then comprise determining an uncertainty range for the fracture aperture based on at least a measured parameter relative to the tool or the wellbore and on the correction(s) (box 7). The uncertainty range may be obtained directly from a measured parameter relative to the wellbore and/or from a property of the wellbore calculated on the basis of one or several measured parameters. This uncertainty range takes into account the weight of the correction or of the corrections in the wellbore as a function of one or several parameters measured in the wellbore, such as the standoff of the tool to the wellbore, the dip of the fractures, the resistivity of the mud and of the formation, etc.

The method will be explained in more details below, in particular the operations relative to boxes 5 to 7. First, embodiments of an apparatus according to one or more aspects of the disclosure are disclosed.

Figure 2:
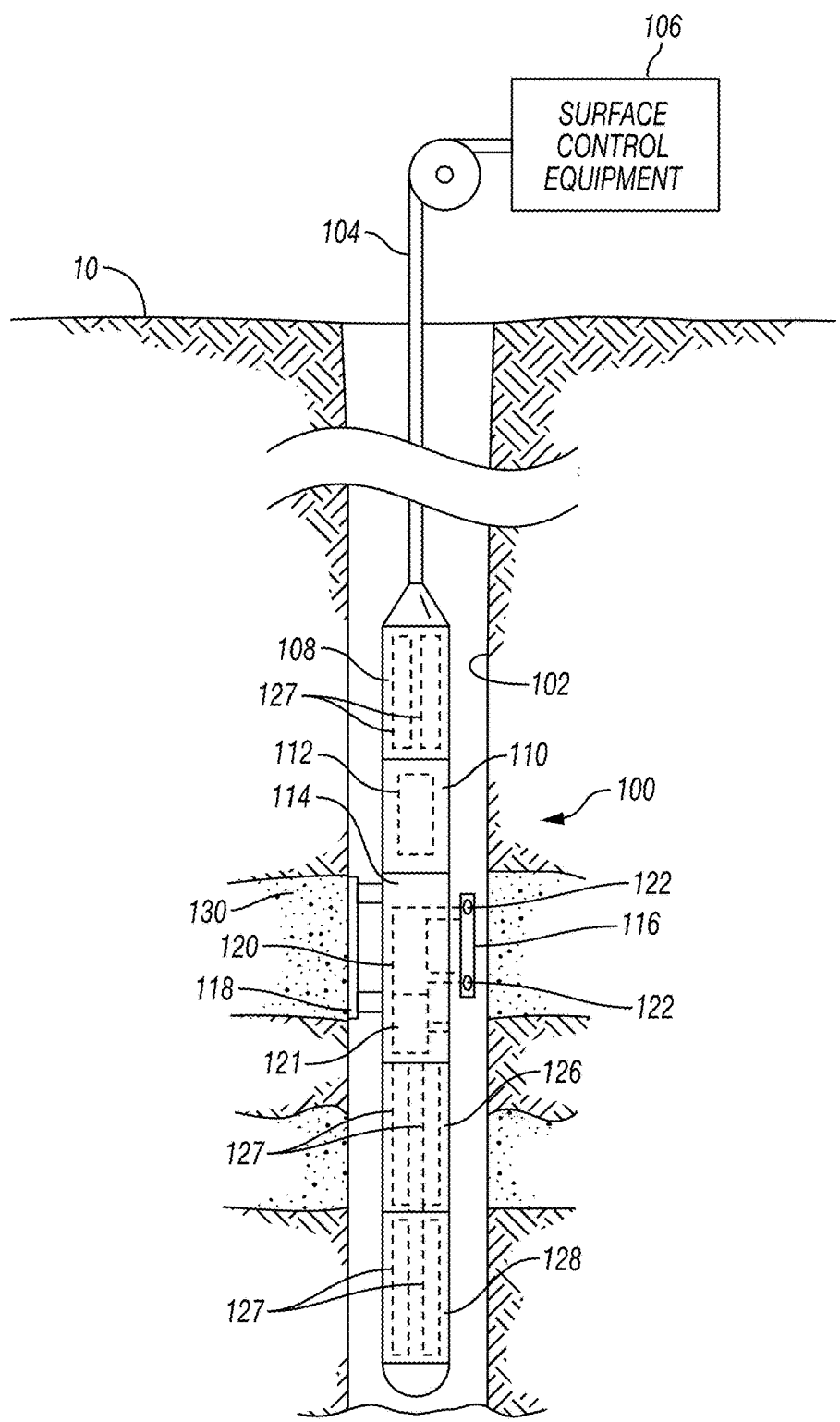
FIG. 2 is a schematic view of at least a portion of apparatus according to one or more aspects of the present disclosure.

FIG. 2 is a schematic view of at least a portion of an apparatus according to one or more aspects of the present disclosure. The apparatus may be utilized at a well site, which may be situated onshore or offshore. The apparatus comprises a downhole tool 100, also called wireline tool, operable to engage a portion of a wall of a wellbore 102 penetrating a subterranean formation 130.

The downhole tool 100 may be suspended in the wellbore 102 from a lower end of a multi-conductor cable 104 that may be spooled on a winch (not shown) at the wellsite surface 10. The cable 104 may be communicatively coupled to surface equipment, such as surface control equipment 106. The surface control equipment 106 may comprise a controller having an interface operable to receive commands from a surface operator. The surface control equipment 106 may further comprise a processor operable to implement one or more aspects of the methods described herein. Alternatively, the processor may be situated remote from the wellsite. It may communicate with the wellsite to receive data obtained from the surface control equipment.

The downhole tool 100 may comprise a telemetry module 110, a formation test module 114 and a sample module 126. Although the telemetry module 110 is shown as being implemented separate from the formation test module 114, the telemetry module 110 may be implemented in the formation test module 114 and/or another module of the downhole tool 100. The downhole tool 100 may also comprise additional components at various locations, such as a module 108 above the telemetry module 110 and/or a module 128 below the sample module 126, which may have varying functionality within the scope of the present disclosure.

The formation test module 114 may comprise a probe assembly 116, which may be selectively extendable away from the downhole tool 100. The formation test module 114 may also comprise a selectively extendable anchoring member 118 arranged on an opposing side of the downhole tool 100 relative to the probe assembly 116. The probe assembly 116 may be operable to selectively seal off or isolate selected portions of the wall of the wellbore 102. For example, the probe assembly 116 may comprise a sealing pad that may be urged against the wall of the wellbore 102 in a sealing manner to prevent movement of fluid into or out of the subterranean formation 130 other than through the probe assembly 116. The probe assembly 116 may thus be operable to fluidly couple a pump 121 and/or other components of the formation test module 114 to the adjacent subterranean formation 130. Accordingly, the formation test module 114 may be utilized to obtain fluid samples from the subterranean formation 130 by extracting fluid from the subterranean formation 130 using the pump 121. A fluid sample may thereafter be expelled through a port (not shown) into the wellbore 102, or the sample may be directed to one or more detachable chambers 127 disposed in the sample module 126. In turn, the detachable chambers 127 may receive and retain the formation fluid for subsequent testing at surface or a testing facility. The detachable chambers 127 may be certified for highway and/or other transportation. The module 108 and/or the module 128 may comprise additional detachable chambers 127, which may also be detachable and/or certified for highway and/or other transportation.

The formation test module 114 may also be utilized to inject fluid into the subterranean formation 130 by, for example, pumping fluid from one or more fluid collecting chambers disposed in the sample module 126 via the pump 121. Moreover, while the downhole tool 100 is depicted as including one pump 121, it may also comprise multiple pumps. The pump 121 and/or other pumps of the downhole tool 100 may also comprise a reversible pump configured to pump in two directions (e.g., into and out of the subterranean formation 130, into and out of the detachable chambers 127 of the sample module 126, etc.). Example implementations of the pump 121 are described below.

The probe assembly 116 may comprise one or more sensors 122 adjacent a port of the probe assembly 116, among other possible locations. The sensors 122 may be configured to determine petrophysical parameters of a portion of the subterranean formation 130 proximate the probe assembly 116. For example, the sensors 122 may be configured to measure or detect one or more of pressure, temperature, composition, resistivity, dielectric constant, borehole imaging, magnetic resonance relaxation time, nuclear radiation, and/or combinations thereof, although other types of sensors are also within the scope of the present disclosure.

The formation test module 114 may also comprise a fluid sensing unit 120 through which obtained fluid samples may flow, such as to measure properties and/or composition data of the sampled fluid. For example, the fluid sensing unit 120 may comprise one or more of a spectrometer, a fluorescence sensor, an optical fluid analyzer, a density and/or viscosity sensor, and/or a pressure and/or temperature sensor, among others.

The telemetry module 110 and/or another portion of the downhole tool 100 may comprise a downhole controller and/or control system 112 communicatively coupled to the surface control equipment 106. The surface control equipment 106 and/or the downhole controller and/or control system 112 may be operable to control the probe assembly 116 and/or the extraction of fluid samples from the subterranean formation 130, such as via the pumping rate of the pump 121. The surface control equipment 106 and/or the downhole controller and/or control system 112 may be further operable to analyze and/or process data obtained from sensors disposed in the fluid sensing unit 120 and/or the sensors 122, store measurements or processed data, and/or communicate measurements or processed data to surface or another component for subsequent analysis.

One or more of the modules of the downhole tool 100 depicted in FIG. 1 may be substantially similar to and/or otherwise have one or more aspects in common with corresponding modules and/or components shown in other figures and/or discussed herein. For example, one or more aspects of the formation test module 114 and/or the sample module 126 may be substantially similar to one or more aspects of a fluid communication module 234 and/or a sample module 236, respectively, which are described below in reference to FIG. 3.

Figure 3:
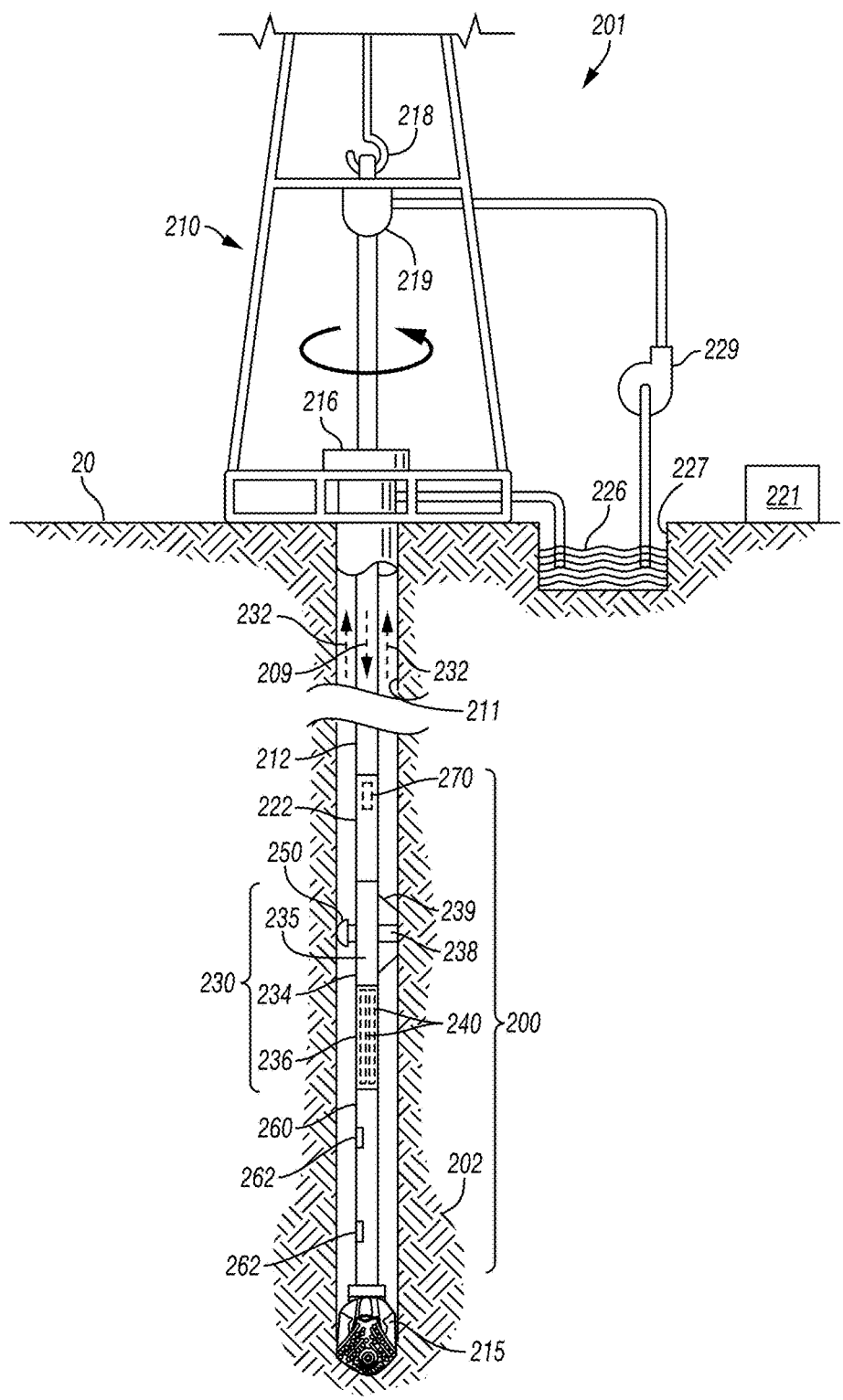
FIG. 3 is a schematic view of at least a portion of apparatus according to one or more aspects of the present disclosure.

FIG. 3 is a schematic view of at least a portion of apparatus according to one or more aspects of the present disclosure. Depicted components at wellsite 201 comprise a rig 210 and a downhole tool 200 suspended from the rig 210 within a wellbore 211 via a drill string 212. The downhole tool 200, or a bottom hole assembly ("BHA") including the downhole tool 200, comprises or is coupled to a drill bit 215 at a lower end that is used to advance the downhole tool 200 into a subterranean formation 202 and form the wellbore 211. The drill string 212 may be rotated by a rotary table 216 that engages a kelly at the upper end of the drill string 212. The drill string 212 is suspended from a hook 218, attached to a traveling block (not shown), through the kelly and a rotary swivel 219 that permits rotation of the drill string 212 relative to the hook 218. A top-drive may also be utilized to rotate and raise/lower the drill string 212, whether instead of or in addition to the kelly/rotary table 216.

The rig 210 is depicted as a land-based platform and derrick assembly utilized to form the wellbore 211 by rotary drilling in a manner that is well known. A person having ordinary skill in the art will appreciate, however, that one or more aspects of the present disclosure may also find application in other downhole applications, such as rotary drilling, and is not limited to land-based rigs.

Drilling fluid 226 is stored in a pit 227 formed at the wellsite 201. The drilling fluid 226 may be an water-base drilling fluid and/or other mud emulsion having a nonaqueous fluid as the external/continuous phase. However, one or more aspects of the present disclosure may also be applicable or readily adaptable to implementations in which the drilling fluid 226 is a oil-base drilling fluid.

A pump 229 delivers the drilling fluid 226 to the interior of the drill string 212 via a port in the rotary swivel 219, for example, such that the drilling fluid 226 flows downward through the drill string 212, as indicated in FIG. 3 by directional arrow 209. The drilling fluid 226 exits the drill string 212 via ports in the drill bit 215 (not shown), and then circulates upward through the annulus defined between the outside of the drill string 212 and the wall of the wellbore 211, as indicated by directional arrows 232. In this manner, the drilling fluid 226 lubricates the drill bit 215 and/or carries cuttings from the formation 202 up to the wellsite surface 20, where it is returned to the pit 227 for recirculation.

The downhole tool 200 comprises various components with various capabilities, such as measuring, processing, and storing information. A telemetry module 222 is also provided for communicating the associated data and/or control signals with surface equipment, such as surface control equipment 221, whether via mud-pulse telemetry, wireline, wired drill pipe, wireless communications (e.g., Wi-Fi, Bluetooth, etc.) and/or otherwise.

The downhole tool 200 also comprises a sampling while drilling ("SWD") system 230 comprising the fluid communication module 234 and the sample module 236, which may be individually or collectively housed in one or more drill collars for performing various formation evaluation and/or sampling functions. The fluid communication module 234 may be positioned adjacent the sample module 236, and may comprise one or more pumps 235, gauges, sensors, monitors and/or other devices that may also be utilized for downhole sampling and/or testing. The downhole tool 200 shown in FIG. 3 is depicted as having a modular construction with specific components in certain modules. However, the downhole tool 200 may be unitary, or select portions thereof may be modular. The modules and/or the components therein may be positioned in a variety of configurations throughout the downhole tool 200.

The fluid communication module 234 comprises a fluid communication device 238 that may be positioned in a stabilizer blade or rib 239. The fluid communication device 238 may be or comprise one or more probes, inlets and/or other means for receiving sampled fluid from the subterranean formation 202 and/or the wellbore 211. The fluid communication device 238 also comprises a flowline (not shown) extending into the downhole tool 200 for passing fluids therethrough. The fluid communication device 238 may be movable between extended and retracted positions for selectively engaging a wall of the wellbore 211 and acquiring one or more fluid samples from the subterranean formation 202. The fluid communication module 234 may also comprise a back-up piston 250 operable to assist in positioning the fluid communication device 238 against the wall of the wellbore 211.

The sample module 236 comprises one or more sample chambers 240. The sample chambers 240 may be detachable from the sample module 236 at surface, and may be certified for subsequent highway and/or other transportation.

The downhole tool 200 may also comprise a module 260, called for instance LWD tool, including sensors 262 operable to measure or detect characteristics of the wellbore 211 and/or the subterranean formation 202. For example, the sensors 262 may be operable to measure or detect one or more of pressure, temperature, composition, resistivity, dielectric constant, borehole imaging, magnetic resonance relaxation time, nuclear radiation, and/or combinations thereof, although other types of sensors are also within the scope of the present disclosure.

The downhole tool 200 may also comprise a downhole controller and/or control system 270 operable to communicate with the surface control equipment 221. The downhole controller and/or control system 270 may be operable to control the telemetry module 222, the SWD system 230 and/or other modules, components and/or features, such as for the extraction of fluid samples from the subterranean formation 202. The surface control equipment 221 may also provide a source of AC power at a selectable (radian) frequency $\omega$ for performing resistivity measurements with the sensors 262 (e.g., including electrodes) of the module 260 (e.g., including a resistivity tool) of the downhole tool 200.

The downhole tool that have been described here are only exemplary embodiments of downhole tools. Such downhole tool may not comprise all the features disclosed above, and in particular the sampling section of the tool is optional.

Figure 4:
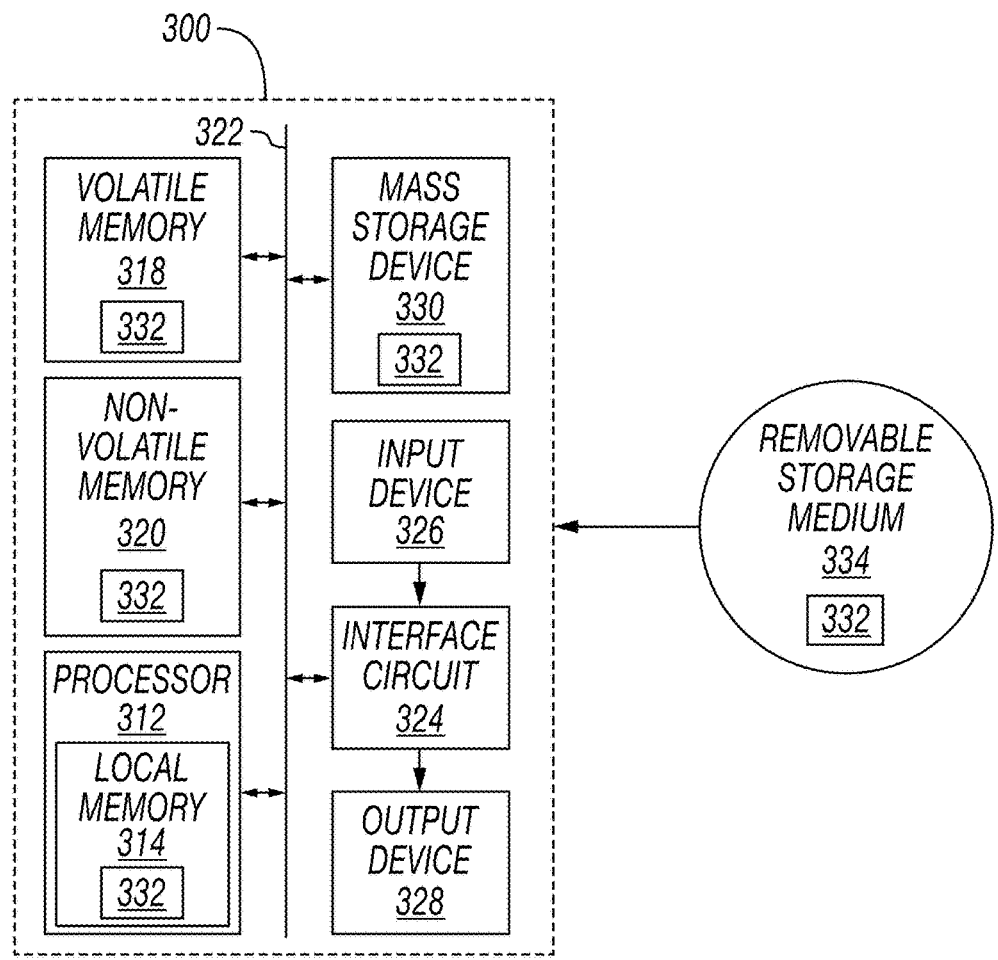
FIG. 4 is a schematic view of at least a portion of apparatus, in particular a processing system, according to one or more aspects of the present disclosure.

FIG. 4 is a schematic view of at least a portion of apparatus according to one or more aspects of the present disclosure. The apparatus comprises a processing system 300 that may execute example machine-readable instructions to implement at least a portion of one or more of the methods and/or processes described herein, and/or to implement a portion of one or more of the example downhole tools described herein. The processing system 300 may be or comprise, for example, one or more processors, controllers, special-purpose computing devices, servers, personal computers, personal digital assistant ("PDA") devices, smartphones, internet appliances, and/or other types of computing devices. Moreover, while it is possible that the entirety of the processing system 300 shown in FIG. 4 is implemented within a downhole tool, such as the downhole tools and/or modules shown in one or more of FIGS. 2 and 3, it is also contemplated that one or more components or functions of the processing system 300 may be implemented in wellsite surface equipment, perhaps including the surface control equipment 106, 221 and/or other wellsite surface equipment depicted in FIGS. 2 and 3, and/or the downhole controller and/or control system 112, 270 shown in FIGS. 2 and 3. As set forth above, all or part of the processing system may also be remote from the wellsite and able to receive data from the wellsite via well-known communication means.

The processing system 300 comprises a processor 312 such as, for example, a general-purpose programmable processor. The processor 312 comprises a local memory 314, and executes coded instructions 332 present in the local memory 314 and/or in another memory device. The processor 312 may execute, among other things, machine-readable instructions or programs to implement the methods and/or processes described herein. The programs stored in the local memory 314 may include program instructions or computer program code that, when executed by an associated processor, enable surface equipment and/or downhole controller and/or control system to perform tasks as described herein. The processor 312 may be, comprise, or be implemented by one or a plurality of processors of various types suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples. Of course, other processors from other families are also appropriate.

The processor 312 is in communication with a main memory including a volatile memory 318 and a non-volatile memory 320 via a bus 322. The volatile memory 318 may be, comprise, or be implemented by random access memory (RAM), static random access memory (SRAM), synchronous dynamic random access memory (SDRAM), dynamic random access memory (DRAM), RAMBUS dynamic random access memory (RDRAM) and/or other types of random access memory devices. The non-volatile memory 320 may be, comprise, or be implemented by read only memory, flash memory and/or other types of memory devices. One or more memory controllers (not shown) may control access to the volatile memory 318 and/or the non-volatile memory 320.

The processing system 300 also comprises an interface circuit 324. The interface circuit 324 may be, comprise, or be implemented by various types of standard interfaces, such as an Ethernet interface, a universal serial bus (USB), a third generation input/output (3GIO) interface, a wireless interface, and/or a cellular interface, among others. The interface circuit 324 may also comprise a graphics driver card. The interface circuit 324 may also comprise a communication device such as a modem or network interface card to facilitate exchange of data with external computers via a network (e.g., Ethernet connection, digital subscriber line ("DSL"), telephone line, coaxial cable, cellular telephone system, satellite, etc.).

One or more input devices 326 are connected to the interface circuit 324. The input device(s) 326 permit a user to enter data and commands into the processor 312. The input device(s) 326 may be, comprise, or be implemented by, for example, a keyboard, a mouse, a touchscreen, a track-pad, a trackball, an isopoint, and/or a voice recognition system, among others.

One or more output devices 328 are also connected to the interface circuit 324. The output devices 328 may be, comprise, or be implemented by, for example, display devices (e.g., a liquid crystal display or cathode ray tube display (CRT), among others), printers, and/or speakers, among others.

The processing system 300 may also comprise one or more mass storage devices 330 for storing machine-readable instructions and data. Examples of such mass storage devices 330 comprise floppy disk drives, hard drive disks, compact disk (CD) drives, and digital versatile disk (DVD) drives, among others. The coded instructions 332 may be stored in the mass storage device 330, the volatile memory 318, the non-volatile memory 320, the local memory 314, and/or on a removable storage medium 334, such as a CD or DVD. Thus, the modules of the processing system 300 may be implemented in accordance with hardware (embodied in one or more chips including an integrated circuit such as an application specific integrated circuit), or may be implemented as software or firmware for execution by a processor. In particular, in the case of firmware or software, the embodiment can be provided as a computer program product including a computer readable medium or storage structure (e.g., non-transitory computer readable medium) embodying computer program code (i.e., software or firmware) thereon for execution by the processor.

Figure 5:
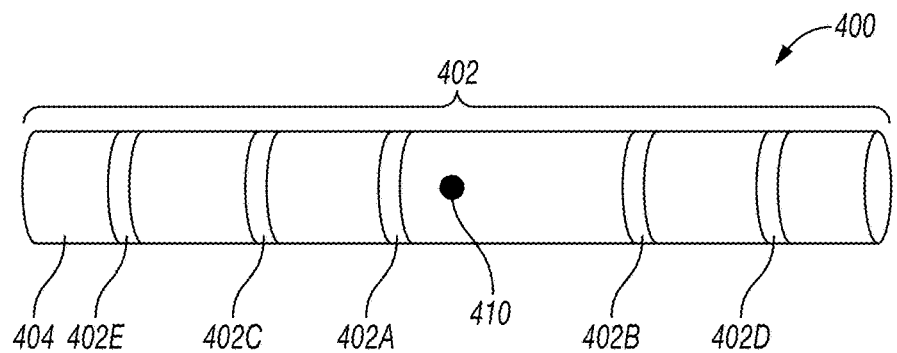
FIG. 5 is a schematic view of at least a portion of apparatus, in particular a resistivity sensor, according to one or more aspects of the present disclosure.

FIG. 5 shows an example of a resistivity sensor 400 that may be used in one of the downhole tools described hereinabove. The resistivity sensor may include one or more toroidal coils that emit and/or detect electromagnetic signals. For example, in the illustrated embodiment, the tool includes several toroidals coil or antenna 402 mounted on the tool, for instance a collar 404 of the tool having a conductive pipe.

In the configuration of FIG. 5, the transmitter toroid antennas include five transmitter toroid antennas 402A, 402B, 402C, 402D, and 402E mounted on either side of a receiver 410. As illustrated, the transmitter toroid antennas 402A, 402C, and 402E are located on one side of the receiver 410 while the transmitter toroid antennas 402B and 402D are located on the opposite side of the receiver 410. Further, each of the transmitter toroid antennas 402A-402E are positioned at different distances from the receiver 410. Accordingly, the transmitter toroid antennas 402A-402E are asymmetrical in that three are disposed on one side of the receiver 410 and two are disposed on the opposite side of the receiver 410, and none of the transmitter toroid antennas 402A-402E are located at the same distance from the receiver 41 as a transmitter toroid antenna 402A-402E located on an opposite side of the receiver 410. Further, in some embodiments, a distance from the receiver 410 of one of the transmitter toroid antennas (respectively 402B, 402C, and 402D) may be greater than a distance from the receiver 410 of one of the transmitter toroid antenna (respectively 402A, 402B and 402C) disposed on the other side of the receiver and less than a distance from receiver 410. Another transmitter toroid antenna (respectively 402C, 402D and 402E) also disposed on the other side of the receiver. Furthermore, in some embodiments, the transmitter toroid antennas 402A-402E may generally be spaced equally from each other on the two sides of the receiver 410. Additionally, while five transmitter toroid antennas 402A-402E are illustrated along the drill collar, it may be appreciated that the tool may include any number of the transmitter toroid antennas greater than two positioned along the drill collar 404.

Further, the receiver 410 of FIG. 5 is illustrated as a button electrode. The button electrode, operating as the receiver 410, is an electrode that may be electrically isolated from a remainder of the collar 404. Additionally, the receiver 410 may also be a receiver ring similarly electrically isolated from the collar 404, but positioned around the collar 404 in a manner similar to the transmitter toroid antennas 402. The axial position of such a ring would remain substantially the same as the position of the button electrode. Additionally, the receiver ring may include a portion of the collar 404 in place of an additional ring placed around the collar 404. When one of the transmitter toroid antennas 402A-402E is fired (e.g., when one of the transmitter toroid antennas 402A-402E transmit a signal), a radial current is generated that flows into the geological formation 12. More precisely, an axial current flows along the collar under the toroid, flows into the geological formation and then returns to the collar. It is designated as a radial current when it flows into the formation and returns. The receiver 410 directly measures such currents to provide information about the geological formation 12 (e.g., when both transmitters 402A and 402B emit the signal, whether at the same or a different time, the receiver 410 may measure the signals from the transmitter toroid antenna 402A and from the transmitter toroid antenna 402B). From a linear superposition of the radial current measured at the receiver 410, the electrical resistivity of the geological formation 12 may be determined.

The resistivity sensor described above is an exemplary embodiment of a sensor that may be used regarding imaging of the borehole. However, any other type of sensors enabling imaging of the borehole may be considered regarding the method and apparatus according to the disclosure.

As set forth above, the method will be explained in more details below.

1. Measurement of the Resistivity (Box 2).

The resistivity is measured thanks to the resistivity sensor as disclosed above.

For example, the following equation may be used to determine the electrical resistivity of the geological formation 12 using the tool illustrated in FIG. 5 with the button electrode:

$$Conductance_{Button} = \frac{T_i B \ T_j R_l + T_j B \ T_i R_l}{T_i R_j \ V_{T_i}}, \quad \text{(Equation 2)}$$

where $T_i B$ and $T_j B$ are the currents received on the receiver 410 (B) from two of the transmitter toroid antennas 402A-402E (e.g., transmitters $T_i$ and $T_j$); $T_j R_l$, $T_i R_l$, and $T_i R_j$ are currents received at transmitter toroid antennas 402 (e.g., $R_l$ and $R_j$) operating as receiver antennas while the respective transmitters $T_i$ and $T_j$ are fired; and $V_{T_i}$ is a voltage measured across one of the transmitter toroid antennas 402A-402E when that transmitter toroid antenna 402 (e.g., $T_i$) is fired.

The resistivity sensor 400 is moved along the wellbore for obtaining the conductivity at each depth, in order to obtain an image from the borehole.

The resistivity measurement disclosed here is known in the art and is exemplary. Any resistivity measurement enabling imaging of the borehole may be used.

2. Measurements of Other Parameters (Optional).

When the downhole tool is moved along the wellbore, several other parameters relative to the wellbore may also be measured, such as temperature, pressure, standoff, orientation of the tool, etc. These parameters may be used later in the method. They may be measured by any appropriate sensor of the downhole tool.

Other parameters may also be measured downhole or at the surface such as parameters relative to the mud.

The parameters relative to the wellbore may not be measured but may be derived from databases of previous jobs and/or relative to the features of the tool or the mud.

From the measured parameters, properties of the formation or of the tool may be calculated by known methods, such as the dip of the fracture or the resistivity or density of the mud.

3. Detection of Fractures (Box 3)

Figure 10:
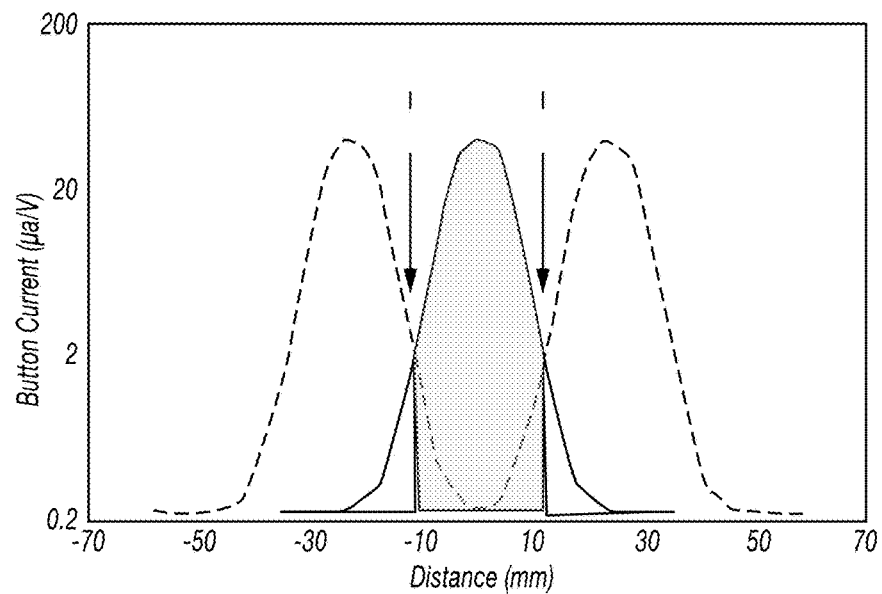
FIG. 10 is a plot showing an example of a tool response when closely spaced fractures are present in the formation.
Figure 15:
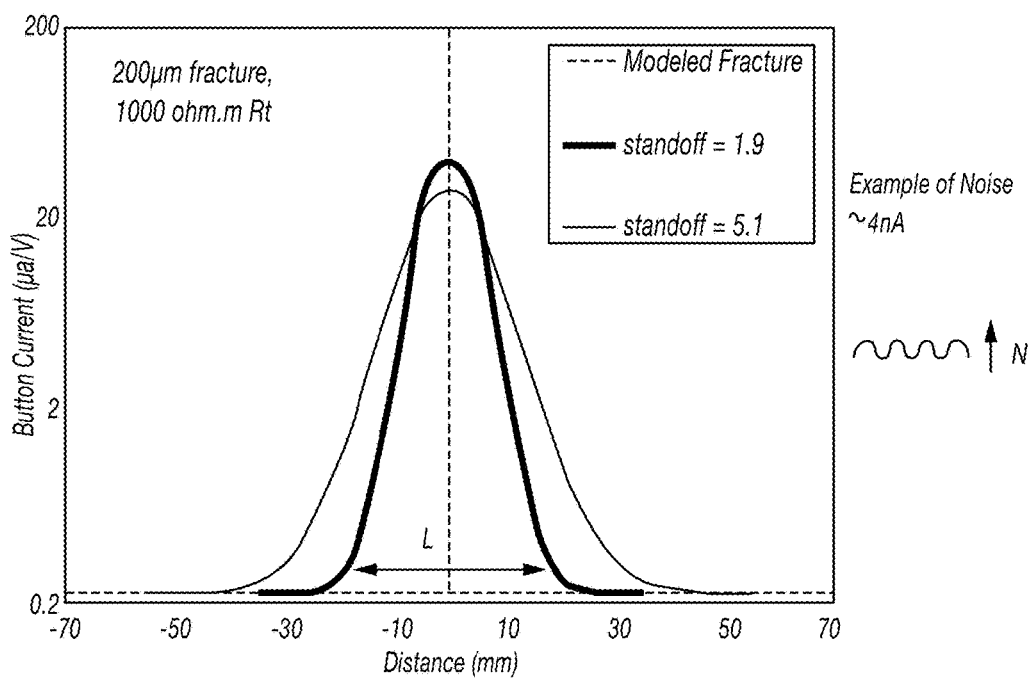
FIG. 15 is a plot of a modelled response of a tool having a resistivity sensor when a fracture is detected and explaining the calculation of the noise.

Generally a fracture generates a peak in the conductivity of the formation (see FIG. 10 or 15). So a fracture may be detected thanks to this peak in an image of the wellbore.

Fractures may be detected by any known method, such as the method of segment extraction technique described in U.S. patent application No. 2011/091078.

Filtering may be carried out before the extraction technique to remove any features which are not fractures and also to remove the low contrast and very short segments.

4. Calculation of Fracture Aperture (Box 4)

Once the fracture are detected, each fracture aperture is calculated via Equation (1) and by integrating in this equation the parameters or properties relative to the wellbore (formation resistivity, mud resistivity, excess current, etc.) obtained for the depth of the fracture.

5. Estimation of Corrections of the Luthi-Souhaité Model (Boxes 5 and 6)

As explained above the estimation may be performed after acquisition of the measurement and calculation of the fracture aperture but it may also be performed at least partially before the measurement and/or calculation. Below are listed a few corrections that may be applied to calculation.

a. Based on Fracture Properties i. Dip.

Figure 6:
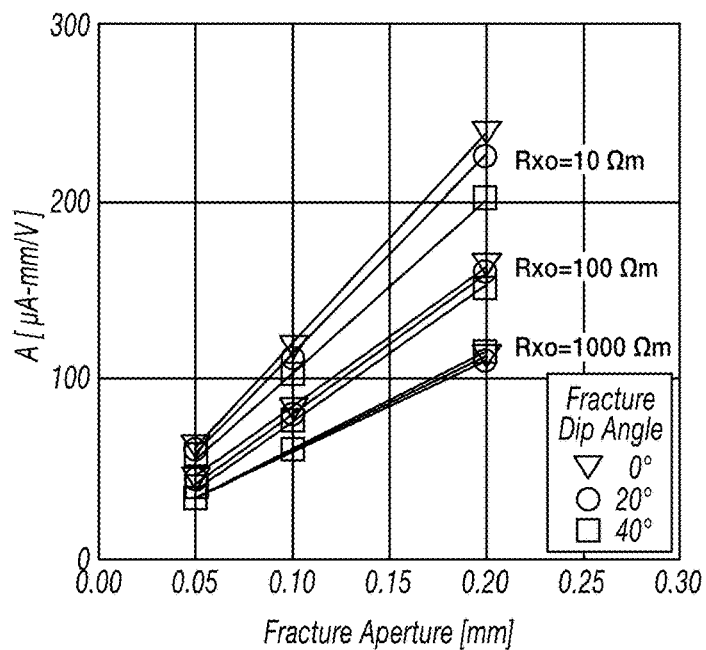
FIG. 6 is a plot of a variation of the excess current measured from a downhole tool as a function of the fracture aperture for predetermined fracture dip angles and formation resistivities.

Equation (1) assumes that the fracture is perpendicular to the borehole and the maximum excess conductivity is measured in this orientation. When the fracture dips relative to the borehole there is a reduction in the measured conductivity. Estimation comprises use of modelling of the response of the logging tool in the case of dipping fractures. Modelling may comprise using previous published data such as the model of Luthi-Souhaité shown on FIG. 6 (extracted from "Fracture apertures from electrical borehole scans", Luthi & Souhaité, 1990). The results of the modelling in this case showed a small dependency on dip up to 40 degrees dip. A different model may be set up for each tool.

It is also known that the angle between the fracture plane and the injected current changes with azimuth for a dipping fracture. Models were carried out at the maximum dip, where the button current is cutting across the fracture plane. However 90 degrees from this the current is mostly injected in the fracture plane. This implies the modelled results give the maximum uncertainties for a given fracture dip and that up to 40 degrees dip the excess current would be within 15% of the perpendicular case. The errors will be directly propagated to the calculated aperture.

Figure 7:
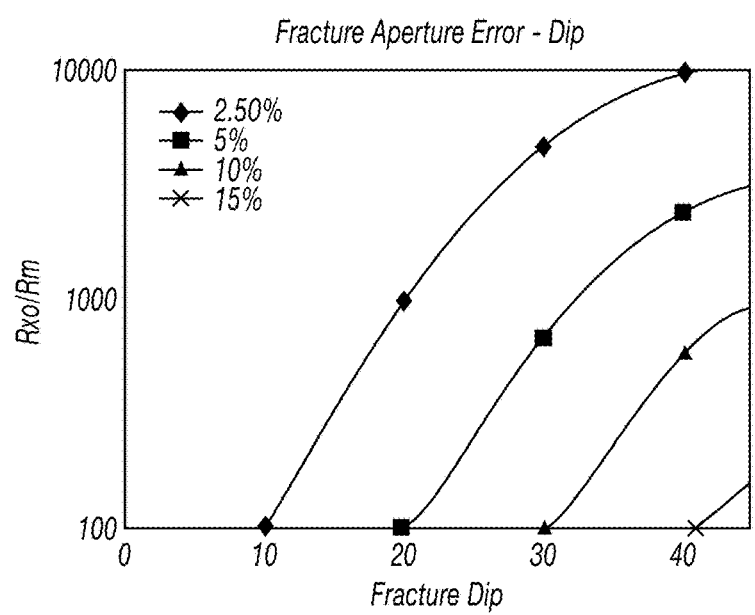
FIG. 7 is a plot of uncertainty ranges for fracture apertures as a function of the fracture dip and the ratio of the formation resistivity to the mud resistivity for a predetermined aperture.

The estimation also comprises extracting the uncertainty variation from the modelling work. An example of this operation is plotted in FIG. 7 that shows uncertainty ranges for fracture apertures as a function of the fracture dip and the ratio of the formation resistivity to the mud resistivity for a predetermined aperture. The plot shows that the uncertainty is expected to increase as the dip increases and as the Rxo/Rm ratio decreases. The plot shown is for a predetermined dip.

ii. Longitudinal Extent of the Fracture.

Equation (1) assumes that the fracture is of infinite length. In practice the volume of measurement is effectively finite and it is the measurement volume relative to the fracture length that is significant. If the fracture is long enough to exceed the measurement volume then the equation is valid. If the fracture is too short to exceed the measurement volume, then the calculation is inaccurate.

Figure 8:
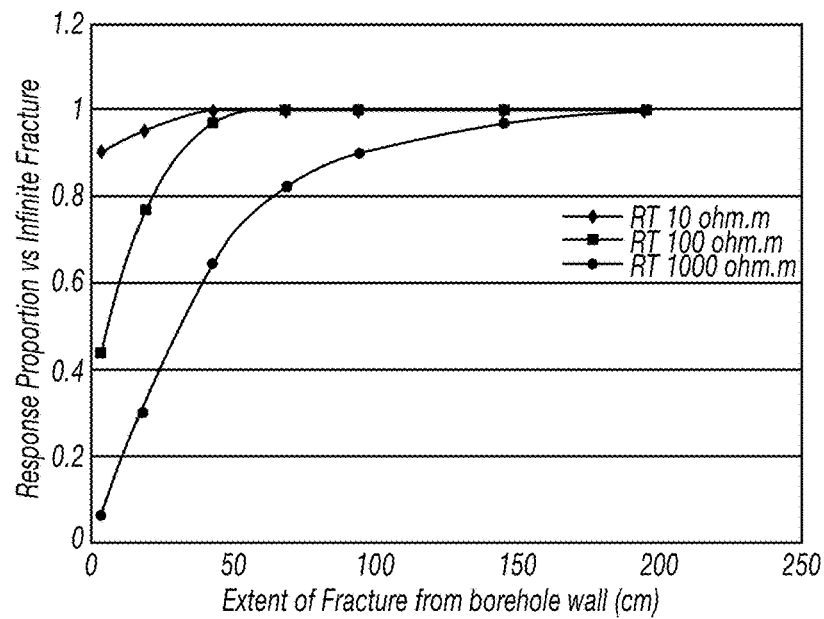
FIG. 8 is a plot of a response of a tool when crossing a fracture as a function of a longitudinal extent of the fracture, when the fracture has a predetermined aperture is filled with a mud having a predetermined mud resistivity, for different background resistivities.

A series of models were created to determine the impact of the longitudinal extent of the fracture on the response of the tool and the aperture calculations. The results show that the background resistivity has a strong control on the results. If the background is relatively conductive, then the measurement is relatively shallow and shorter fractures can be accurately determined. Conversely if the background resistivity is high, the measurement is relatively deep and longer fractures are required for accurate aperture calculation. This is illustrated in FIG. 8 for a fracture having a predetermined aperture (here, 200 microns) filled with muds having a predetermined mud resistivity for different background resistivities. The normalized response is plotted against the extent of the fracture from the center of the tool.

An uncertainty range may be derived easily from this plot as the response of the tool on which Equation (1) is based corresponds to the response when the fracture is of infinite length, ie the response having the value 1.

We can estimate from this plot that for a 10 ohm·m background and fractures longer than 25 cm, fracture apertures can be determined with an uncertainty of less than 5%. For a 1000 ohm·m background and a 25 cm fracture this deteriorates to an error of 50% or more. Different fracture apertures have slightly different response functions with the fracture length, but some aperture values such as 200 microns may be taken as a representative example. However, additional modelling may of course be performed for determining the influence of the aperture of the fracture on the response of the tool when the length of the fracture varies.

Figure 9:
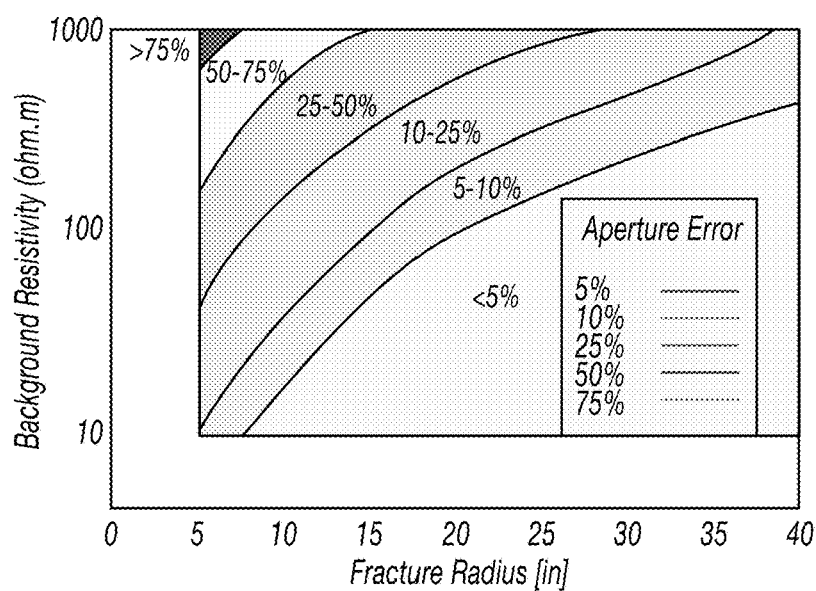
FIG. 9 a plot of uncertainty ranges for fracture apertures as a function of the fracture longitudinal extent and the formation resistivity for a predetermined aperture and mud resistivity.

Of course, for this estimation, a plot showing uncertainty ranges as a function of fracture longitudinal extent and background resistivities for predetermined mud resistivity and fracture aperture may also been set up as part of the estimation, as shown on FIG. 9.

iii. Plurality of Fractures.

Equation (1) assumes that the response is due to a single fracture for the calculation of apertures. Where fractures are widely spaced, each fracture is individual. If fractures are more closely spaced there comes a point where the responses overlap. With very close spacing (close or less than the measuring device size) the signals merge and the result is some average for the combined fractures.

In the case where the peaks overlap, an example of the response of the tool is shown on FIG. 10. Then, there may be two cases. One is that the tail of one peak is not fully accounted for (this is compensated by additional signal from the adjacent peak but the amount may be different depending on the size of the peak). The second is that in some cases the background could be taken at the inflection point I between the peaks. This could have the effect of falsely raising the background and reducing the excess conductivity used in the calculation. In practice the method for selecting the background resistivity does not only rely on the inflection points but also selects lower conductivity values for the background in the vicinity of the fractures. Cases where the background might not be assigned correctly are: (i) where multiple fractures are very closely spaced or (ii) where fractures occur in very thinly bedded horizons. Even in the cases where the background is incorrectly assigned, the impact is generally quite small for reservoir conditions.

Figure 11:
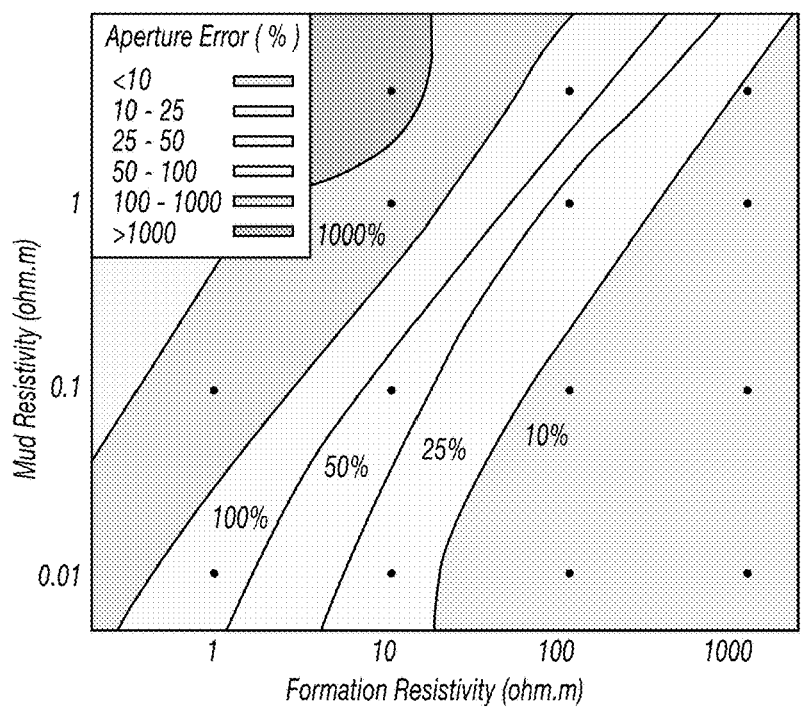
FIG. 11 is a plot of uncertainty ranges for fracture apertures as a function of the formation resistivity and mud resistivity when the background is incorrect by a factor of 2.

In view of the above, estimation may comprise considering the case when there is an overestimation of the background due to multiple close fracture and setting a maximal error for background resistivity when the above hypothesis is not met. If we consider a 2 times overestimate of the background which would be a maximization of the error on the background calculation in this case, the calculated aperture is in most cases less than 10%. Higher errors occur where the standoff is high (peak of fracture is smaller relative to the background) and where the contrast between the background and the fracture is low (conductive formations and fresh muds). A plot showing the errors in using an incorrect background resistivity for a range of mud and formation resistivities may be set up as part of the estimation operation and is shown in FIG. 11. The plot shows the error in the case the background in incorrect by a factor of two.

iv. Fluid Fill.

Equation (1) also assumes that the resistivity of the fluid filling the fracture is known. The general assumption is that drilling mud fills the fractures and is appropriate for the calculations. For larger fractures, particularly at the time of drilling, this is likely to be true. However for smaller fractures or after longer periods of time the fluid may not be the whole mud. There is a large body of literature discussing the invasion of fractures by drilling mud and the impact of the mud properties on curing losses. The properties of the mud are shown to influence when a fracture will be invaded by whole mud, when the fracture will be bridged (and invaded by filtrate) and when a mud cake will form within the fracture. In some circumstances, the drilling mud by itself is unable to seal the fracture and other materials are added to help cure the losses (nut plug, mica and other fibers are common). The type of fluid filling the fracture then introduces an uncertainty in the calculation of the fracture aperture as the resistivity of the whole mud, the mud filtrate and the mud cake is not the same.

Figure 12:
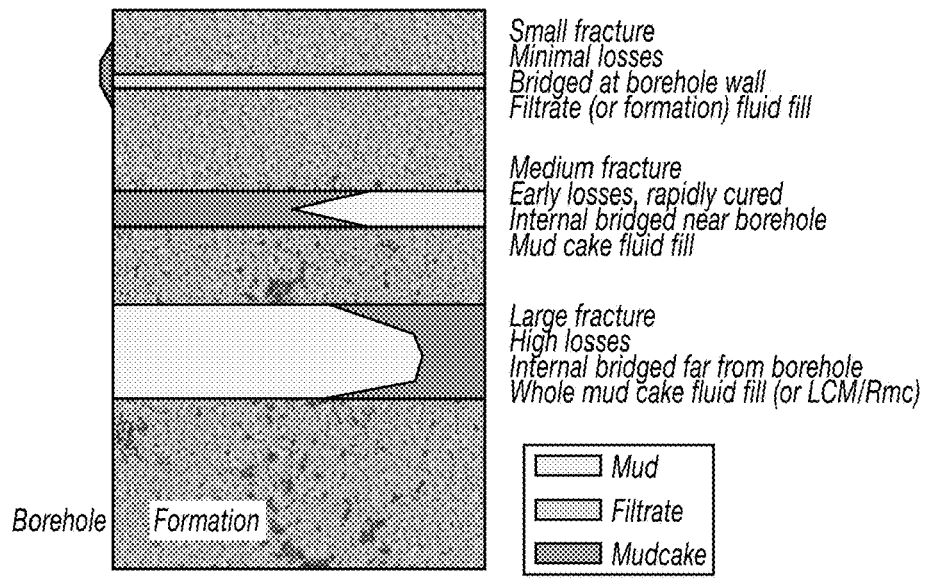
FIG. 12 is a schematic drawing illustrating a model of fluid fill according to fracture aperture.

The estimation comprises setting up a model of different type of fluid fill depending on the configuration, and more particularly the aperture, of a fracture. An example of a model that has been set up is shown on FIG. 12. This model is based on mud and rock properties and is based on the literature on curing mud losses. A summary is as follows:

Small fractures are likely to be bridged by the solid particles in the mud and invaded by filtrate. The aperture that bridging occurs at depends on the particle size range within the mud. It was demonstrated that particles need to be ⅓ the size of pores (or gaps) to enable bridging. More recent work suggests that effective bridging requires the 90 percentile of the particle size to be roughly the size of the biggest gaps for effective bridging. If the mud particle size is available it could be used to determine a minimum aperture for use of whole mud and a maximum aperture for filtrate (based on the "D90" particle size or 3 times the "D50" particle size for example).

Concerning the large fractures, it may be assumed that whole mud invades these fractures. If losses are not cured, it can be assumed that whole mud fills the fracture at logging time, particularly the early time of logging while drilling). But, if losses are cured, then fluid filling the fracture can be complex. In cases where formations are permeable and fractures are large, invasion occurs from the wall of the fracture. Mud-cakes can fill or partially fill the fractures.

A more complex model may be set up concerning large fractures as different types of lost circulation material are used as mud additives where losses have occurred. These can have very different electrical properties that will introduce significant uncertainty into fracture aperture calculations. The estimation disclosed in this example does not take into account this hypothesis.

Once the model is set up, to understand the potential impact of using an incorrect fluid, the estimation comprises making a series of calculations substituting Rmf (resitivity of the mud filtrate) or Rmc (resistivity of the mud cake) for Rm (resistivity of the mud) in the Equation (1).

The estimation may then also comprise calculating the resistivity of mud cake and mud filtrate. For a series of mud resistivities between 0.02 and 2 ohm·m, mud filtrate and mud cake resistivities have been calculated using the Overton-Lipson equations. It may also comprise modelling the fracture aperture in view of mud resistivity in several configurations of the wellbore, such as for several mud particle size ranges.

Figure 13:
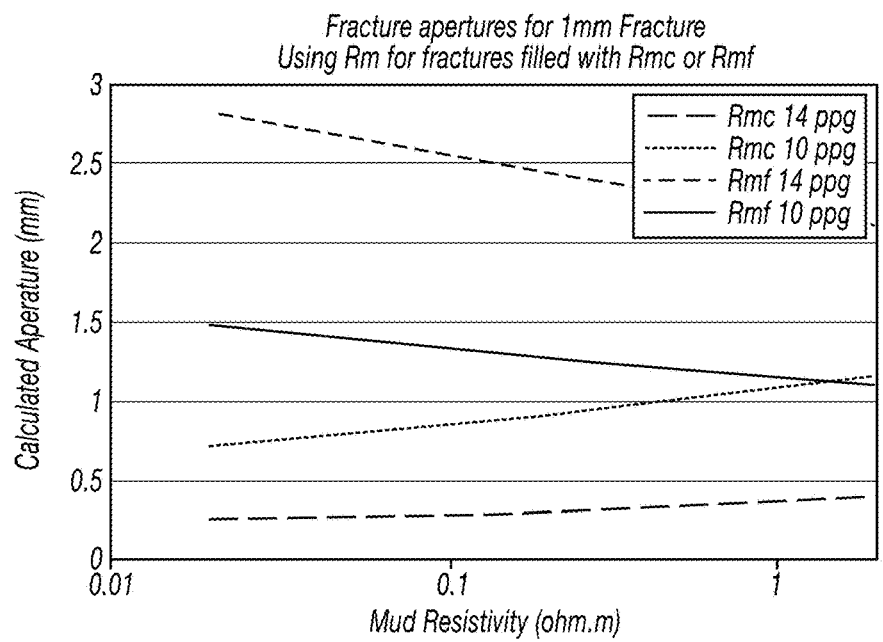
FIG. 13 is a plot of a ratio of the calculated aperture using resistivity of the mud filtrate or of the resistivity of the mud cake on the calculated aperture using resistivity of the whole mud as a function of the mud resistivity and the mud density

The chart in FIG. 13 shows the errors in the aperture calculation by using the mud resistivity rather than the filtrate or mud cake. If filtrate is present (and Rm is used in the calculation) errors can be 300% for heavier muds (14 ppg) and are less than 50% for lighter muds (10 ppg). If mud cake is present the potential errors are bigger if Rm is used in the calculation. For heavy muds the calculated value can be 25% of the true value, with the fracture aperture generally underestimated. Errors are also generally higher for more conductive muds.

v. Incorrect Background Resistivity Determination.

The Luthi-Souhaité equation is based on a single fracture with a uniform background resistivity. The method for determining the background resistivity is well-known and assumes that the lower 20 percentile in conductivity of either the response across the fracture or the whole image area between one foot above and below the relevant fracture segment is the background conductivity. This works very well for uniform rocks, zones with multiple fractures or with a few small heterogeneities. However there are some circumstances where the current method may result in an incorrect calculation of the background, for instance the case where a fracture is bound within a very thin relatively conductive layer, surrounded by resistive layers.d.

Figure 14:
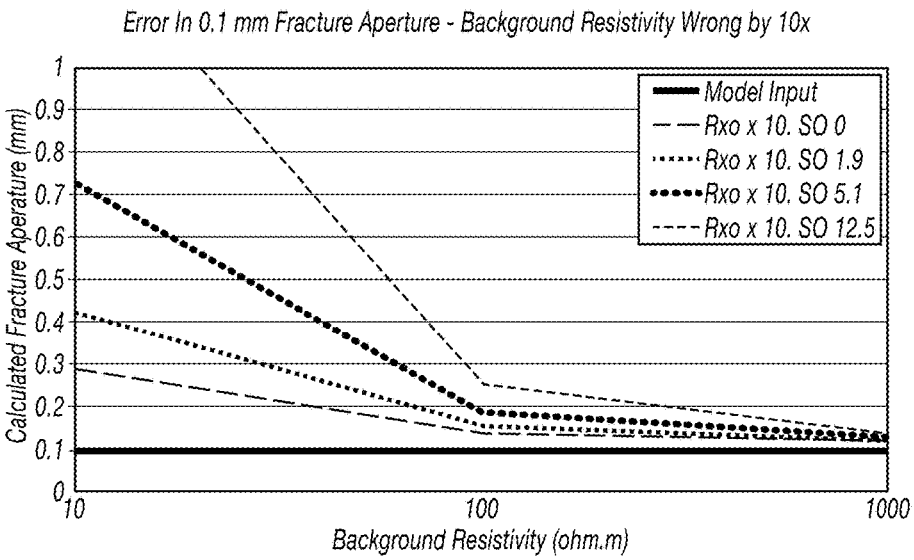
FIG. 14 is a plot of the fracture aperture as a function of the background resistivity for a predetermined fracture aperture and for several standoffs.

The combined impact of the incorrect aperture calculation based on both additional excess current and false background has been made. The estimation comprises setting a maximal error for background resistivity when this hypothesis is not met and calculating the fracture aperture on the basis of the Equation (1) when the background resistivity corresponds to the maximal error, for instance 10 times higher, than the true layer background. The estimation comprises for instance calculating the aperture as a function of a background resistivity measured and as a function of the standoff. The estimation may also comprise plotting the calculated aperture as a function of the background resistivity for several different standoffs and for a predetermined aperture. FIG. 14 shows for example the impact of a wrong background resistivity by a factor of 10 on the calculated fracture aperture as a function of the background resistivity at different standoffs, for a 100 microns fracture.

The figures show that the largest errors occur where the background resistivity is low. In these conditions the proportion of excess current from the incorrect background is high (and from the fracture is relatively small). The fracture apertures can be seriously overestimated (factors of 10 or more). At higher background resistivity, the contrast with the fracture is high and the contribution of additional excess current is relatively small. Errors in the calculated aperture are smaller in these cases and are in the order of 20 to 40%.

b. Based on Tool Response.

i. Signal to Noise Ratio.

Naturally occurring fractures can have a wide range of apertures. They are found from the microscopic scale (fractures within single grains) up to fractures of a few millimeters in width (and rarely larger). In the subsurface the large majority of fractures are considerably thinner than borehole imaging tools can fully resolve. This emphasizes the likelihood that fractures encountered in the subsurface are likely to be below the resolution of the logging device sensor. The Equation (1) allows fractures much smaller than the sensor size to be quantified. However there are limits on the minimum size that can be detected. Factors that control the theoretical detectable limit are in particular the conductivity contrast between the fracture and the formation, signal noise vs fracture peak, the spread of the peak due to standoff of the sensor from the formation.

Concerning the signal to noise ratio, one approach of the estimation is to consider the signal to noise ratio and take a minimum peak height above the noise level. A complete approach may be to model a range of fracture widths and compare to the noise level. This approach is not presented here. A quick alternative is use the fracture aperture equation and calculate widths that would be found at a level substantially higher than the noise level, for instance 10 times the noise level. It ensures that the fractures detected at this current value are not due to noise.

Noise levels for the sensors have been investigated in the laboratory and on field data. This has been shown to be in the order of a few nanoamperes. This has almost no impact on the high conductivity side of the measurement (typical for fluid filled fractures). Noise becomes significant at high background resistivity. For the purpose of estimating the minimum fracture size that can be detected, a peak height of 10 times the noise level was used.

The integrated area A in response to the fracture is used as an input to the Equation (1). As a rough estimate the width of the response L could be multiplied by the noise N to give a maximum potential area response to the noise, as shown in FIG. 15, and the variable A may be determined by multiplying L*N by a predetermined factor. FIG. 15 shows a modelled response of a 200 microns in a 1000 ohm·m background resistivity for a predetermined tool (with a 4 nA noise).

In other words, the estimation comprises determining a noise level for a predetermined tool, for instance via a modelling of the tool and determining a value of the variable A of the Equation (1) based on the noise level. The estimation may then determine the minimum theoretical fracture width W that may be calculated from the model of Equation (1). The noise calculation may also be used to determine an uncertainty for the calculated fracture aperture.

Figure 16:
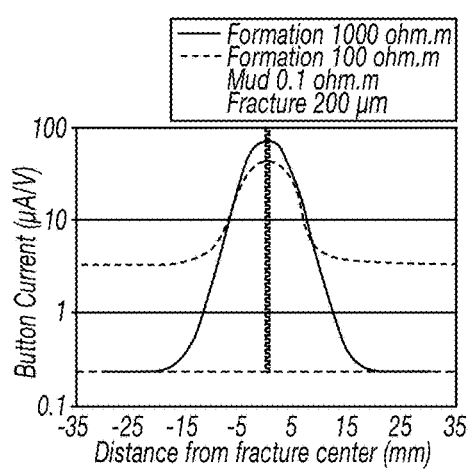
FIG. 16 is a plot of a modelled response of a tool having a resistivity sensor when a fracture is detected for different formation resistivities.

The modelling also shows that a contrast between the fluid filling the fracture and the background resistivity is one of the controls on the response of the imaging tool to a fracture. For a particular fracture width, higher contrast between the fluid and the background results in a greater observed peak of excess conductivity. This is illustrated in FIG. 16 which shows the modelled response of two fractures of the same width, filled by the same fluid but with different background contrasts.

Figure 17:
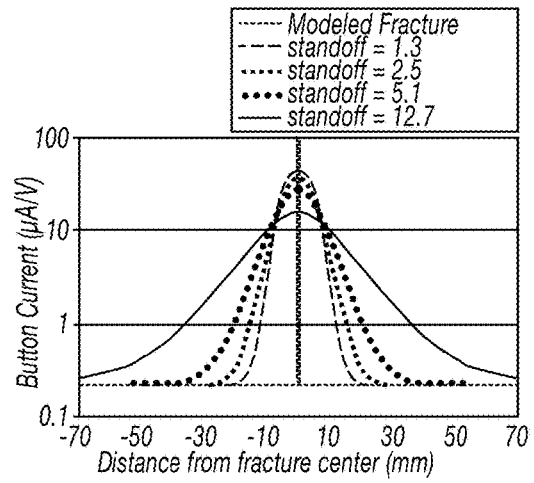
FIG. 17 is a plot of a modelled response of a tool having a resistivity sensor when a fracture is detected for different standoffs

The modelling also shows that standoff, or distance between the sensor and the formation wall, also plays a part in the minimum aperture calculation. LWD tools are part of the drill collar and therefore always have a standoff. This standoff can be variable around the hole, depending on the gauge of the stabilizer, the size of the borehole and the angle of the well. For high resolution images, stabilisers are generally ⅛" less than the bit size. LWD measurements have the advantage of being early in time and so hole conditions are generally good. However even in a perfect borehole, the tool is likely to be eccentered to one side of the borehole and a variable standoff is expected. Extensive tool response modelling may include the calculation of excess current with changing standoff. The results of such modelling showed that the response changes with increasing standoff—the peak of excess current at the fracture decreasing but the width of the peak increasing, as shown on FIG. 17, for a 200 microns fracture in a 1000 ohm·m rock resistivity. Further it was shown that despite the change in shape, the integrated excess conductivity caused by the fracture is maintained.

Figure 18A:
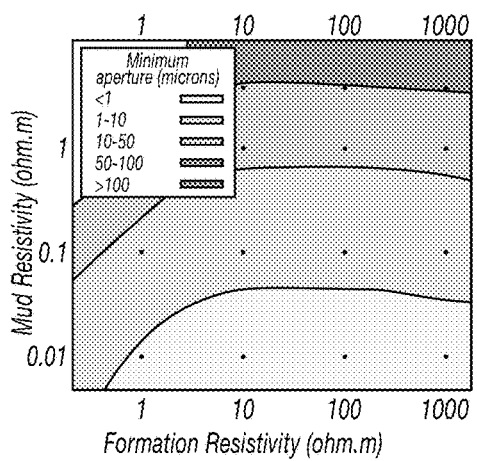
FIGS. 18A and 18B are charts of the minimum aperture of the fracture that may be calculated from the equations with confidence, as a function of the mud resistivity and the formation resistivity for two different standoffs.
Figure 18B:
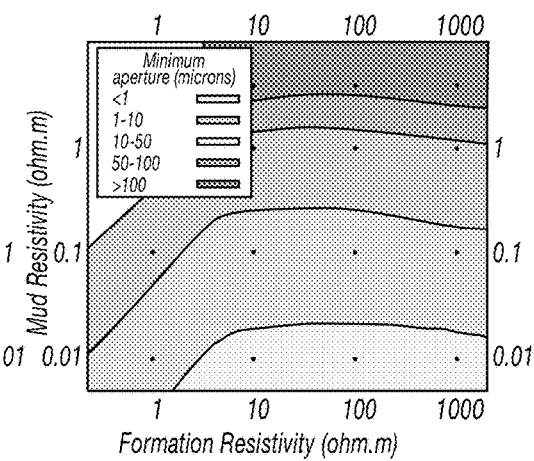

The theoretical minimum aperture that can be detected by the LWD tool is then estimated based on the combination of: (i) the contrast in the resistivity of the fracture and the background, (ii) the size of the peak of the excess conductivity detected above the noise level and (iii) the variation in the size of the peak due to the standoff. On the basis of the modelling, the estimation may comprise plotting a chart of minimum aperture that may be calculated from the equation as a function of the formation resistivity and mud resistivity for different standoff, as shown on FIGS. 18A (standoff of 1 mm) and 18B (standoff of 12 mm). These charts may then be used for determining the uncertainty in the fracture apertures calculated from the model. It can be seen on the FIGS. 18A & 18B that the mud resistivity is the main control for a given standoff, except when the formation to mud contrast is low. In addition, higher standoffs result in larger minimum detectable apertures.

ii. Scaling of the Tool.

Quantitative analysis requires that the tool response is calibrated (sometimes termed "scaled") to a valid formation resistivity or background resistivity. The background resistivity is the term Rxo from Equation (1). Estimation may comprise setting up a model of the tool calibration with predetermined errors (for instance, from −50% to +200%) and calculating the fracture aperture with the Equation (1) taking into account the errors from the calibration.

The range for maximum expected errors by using the wrong calibration in the fracture apertures are relatively low (approximatively between −10% and +15%) even when the calibration error is high. In the majority of the cases, using the wrong curve for calibration would result in <5% variation from the true calculated aperture.

An incorrect scaling of the tool is therefore not always taken into account. However, if it is, the estimation comprises setting a maximal error for a variable of the Equation (1) due to the calibration of the tool. This maximal error may be determined empirically or in view of modelling of the tool and/or in view of previous jobs performed with the tool. The estimation may also comprise calculating a variation of the fracture aperture in view of the maximal error and setting up a plot showing uncertainties of the fracture aperture in view of the value of the formation resistivity.

In the above paragraph, corrections of the model for several hypothesis have been reviewed. However, the estimated corrected are not limited to what has been disclosed above. For instance, further hypothesis that can be corrected is that there is no invasion in the borehole. Moreover the estimation of the correction for any hypothesis disclosed above may be obtained by other method that the ones disclosed above.

All the parameters or properties mentioned above may not be taken into account in the estimation(s), for instance if a parameter is considered as having not an important weight in the correction, it may be estimated roughly or approached by a representative value and not modelled in order to be replaced by the measured or calculated value in the wellbore. Additional parameters or properties may also be taken into account in the estimation 6. Determining an Uncertainty Range (Box 7).

On the basis of each correction, the method then comprises determining an uncertainty range for the correction and for a predetermined configuration of the wellbore on the basis of at least a parameter of the wellbore at the depth of the fracture, for instance a parameter that was measured in the wellbore or derived from database. The uncertainty range may be obtained from the measured parameters and/or from the properties relative to the wellbore calculated on the basis of the measured parameters.

For instance for the corrections listed above, the determination comprises:

Obtaining a mud resistivity, a formation resistivity, a standoff for each depth and a corresponding calculated fracture aperture. In view of the above and of the estimated correction (b.i), determining if the fracture aperture may be considered as estimated with confidence in view of the noise of the tool. When the fracture is considered as having a sufficient aperture, an uncertainty range may be calculated more precisely to be associated with this fracture. When the fracture is not considered as having a sufficient aperture, it is considered it cannot be relied upon the calculation to derive property of the fracture and of the formation, Obtaining the dip of the fracture, and the formation and mud resistivity for the depth of the fracture as well as the calculated fracture aperture. In view of the above and of the estimated correction (a.i), determining an uncertainty on the fracture aperture calculation due to dip of the fracture, Obtaining the extent of the fracture in the borehole, the formation and mud resistivity for the depth of the fracture as well as the calculated fracture aperture. In view of the above and of the estimated correction (a.ii), determining an uncertainty on the fracture aperture calculation due to extent of the fracture, Obtaining background resistivity, mud resistivity for the depth of the fracture and in view of the above and of the estimated correction (a.iii), determining an uncertainty on the fracture aperture calculation due to possible multiple fracture in the borehole. In the disclosed embodiment, it has been disclosed that the maximal error on the background due to multiple fractures was set to a predetermined value. However, the error may be modelled to vary in view of the configuration of the formation. For instance, if a zone of the formation does not comprise a lot of fractures, the maximal possible error for this zone may decrease compared to a zone where a lot of fractures are detected, Obtaining a mud resistivity, a density of the mud and the calculated fracture aperture. In view of the above and of the estimated correction (a.iv), determining an uncertainty on the fracture aperture calculation due to unknown fluid fill of the fracture. The correction may be applied or not to a predetermined fracture in view of the aperture of this fracture. Further, two other cases than the whole fluid fill of the Luthi-Souhaité model are considered in the estimation (a.iv). In view of the fracture aperture and/or of other parameters or properties relative to the wellbore, only one of this case may be used to determine the uncertainty, Obtaining background resistivity, mud resistivity, standoff for the depth of the fracture and calculated fracture aperture and in view of the above and of the estimated correction (a.v), determining an uncertainty on the fracture aperture calculation due to background uncertainty. In the disclosed embodiment, it has been disclosed that the maximal error on the background was predetermined. However, the error may be modelled to vary in view of the configuration of the formation. For instance, if a zone of the formation is homogeneous, the maximal possible error for this zone may decrease compared to a zone where heterogeneity of the layers of the formation is detected, Once each uncertainty range due to each hypothesis has been determined, the uncertainty range may be combined in order for the total uncertainty range to be determined. The uncertainty range may then be plotted as a function of the depth of the wellbore.

Figure 19:
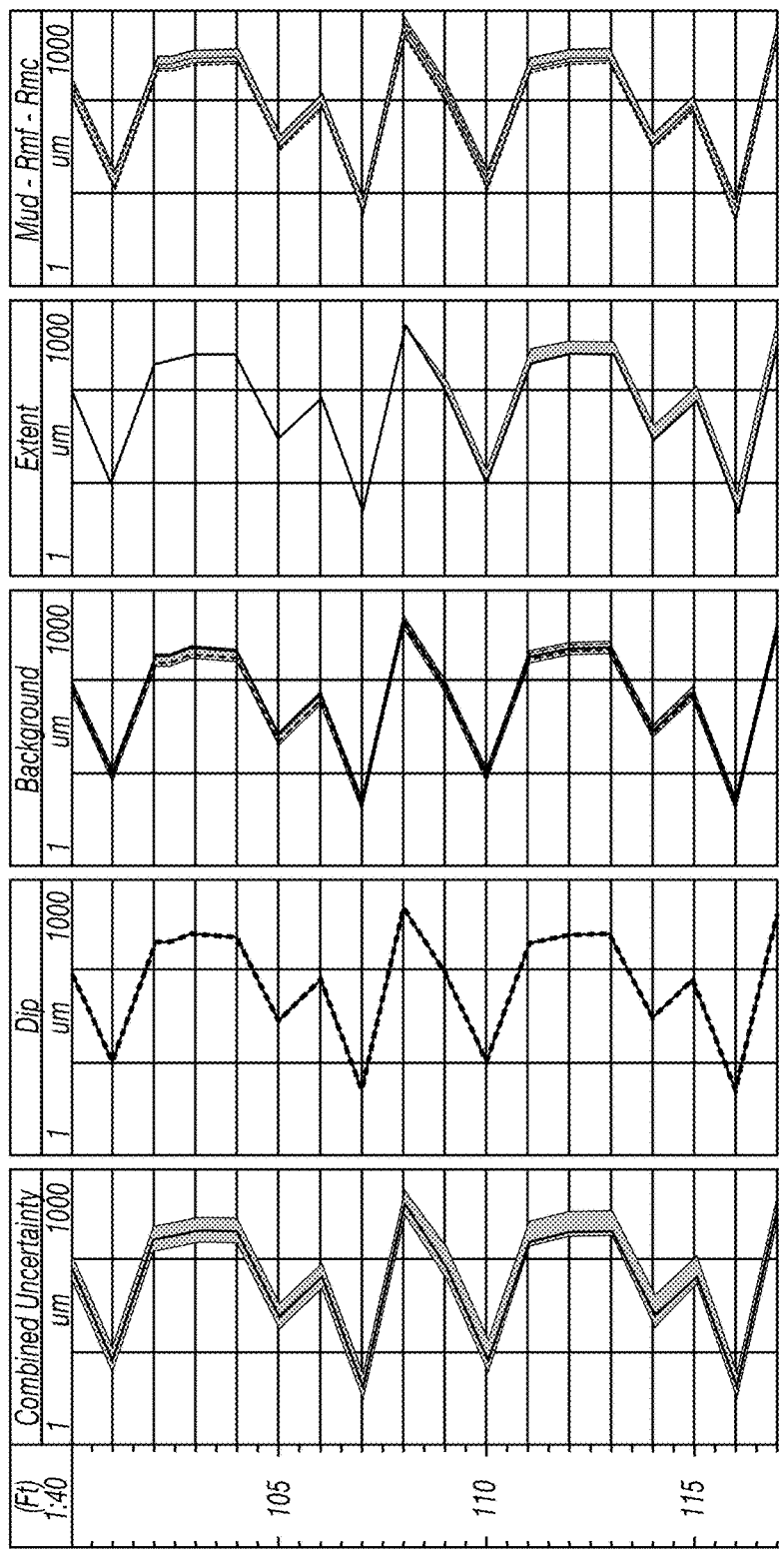
FIG. 19 is a chart of an uncertainty range of fracture apertures related to fractures of a wellbore as a function of depth.

FIG. 19 is a plot showing the uncertainty on the fracture aperture calculation as a function of depth. Tracks 2 to 5 show the effect of one estimated correction while track 1 shows the total uncertainty range due to combined effects of the corrections. The depth which are not associated with uncertainty range are depth for which it has been determined that the fractures did not have sufficient aperture to be taken into account.

The determination may be performed in real-time when the parameters are obtained in real-time. In this case, the estimation of the correction may have been partially performed before the drilling so as to reduce the time of the determination.

Of course, any appropriate estimation may be taken into account for determining the uncertainty. The determination of uncertainty range may be based on one or any number of corrections.

7. Additional Steps of the Method.

Once the uncertainty range for the fractures is determined, the results may be used for taking a drilling, completion or cementing action in view of the fracture aperture and the uncertainty range such as including a predetermined additive in the mud.

Indeed, common applications for the quantification of the apertures of the fractures include understanding the relative contribution to fluid flow of different fractures (or fracture sets) for production, cementing or understanding fluid loss during drilling, understanding stress states in the vicinity of the borehole (or extrapolated to the reservoir) and calculating the carried out at multiple scales and using multiple techniques (from seismic to core scales). It may enable to perform appropriate actions relative to the wellbore, for instance in order to enhance its stability and/or to limit or eliminate kicks or losses in the wellbore.

The method may also comprise calculating a corrected fracture aperture based on the estimated correction or corrections. This corrected fracture aperture may be determined also based on the measured parameters and/or properties of the borehole. For instance, considering the dip, the modelled database of dip of fractures can be used to apply a correction to the calculated fracture apertures. The other corrections of the model may also be used for calculating a corrected fracture aperture.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The disclosure relates generally to a method for determining a fracture aperture of at least a fracture aperture in a wellbore, comprising:
  Measuring a resistivity of the wellbore with a downhole tool in a wellbore for obtaining an image of the wellbore,
  Detecting at least a fracture in the wellbore,
  Calculating a fracture aperture of the detected fracture according to a predetermined model of the wellbore, the model being set up based on at least an hypothesis relative to the configuration of the wellbore,
  Estimating a correction to the predetermined model when at least one of the hypotheses is not met,
  Based on at least a measured parameter relative to the wellbore and on the correction, determining an uncertainty range for the fracture aperture The fracture aperture may be calculated on the basis of the following equation:

$$W = c \cdot A \cdot R_m^b \cdot R_{xo}^{1-b} \quad (1)$$

Where:
  W=fracture aperture (mm);
  A=excess current (μA mm/V);
  $R_m$=mud resistivity (ohm·m);
  $R_{xo}$=background formation resistivity (ohm·m);
  b and c are parameters relative to the tool.

At least an hypothesis may be the following:
  The response of the tool is due to a single fracture.
  Fractures are perpendicular to the wellbore.
  Fractures are of infinite length and constant width.
  Fractures are filled with one fluid of known resistivity, such as whole drilling fluid.
  Scaling of imaging tool response to resistivity is valid.
  Formation is of uniform material.

According to an embodiment of the disclosure, the method may comprise determining at least a property relative to the wellbore based on the measured parameters, and obtaining the uncertainty on the basis of at least one of the property. The parameter and/or property may comprise at least one of the following:
  Standoff of the tool relative to the wellbore
  Dip of the fracture,
  Longitudinal extent of the fracture,
  Resistivity of the drilling fluid,
  Resistivity of formation,
  Density or particle size range of the drilling fluid.

According to an embodiment of the disclosure, the method may also comprise:
  Estimating a first correction to the predetermined model when a first hypothesis is not met,
  Estimating a second correction to the predetermined model when a second hypothesis is not met,
wherein determining the uncertainty range is based on the first and second corrections.

According to an embodiment of the disclosure, determining the uncertainty range may be based on the calculated fracture aperture.

According to an embodiment of the disclosure estimating a correction may comprise at least one of the following:
  Modelling a response of the tool or a configuration of the formation,
  The model of the wellbore being based on at least a variable relative to the wellbore, setting a maximal error for a variable.

Estimating a correction may comprise estimating, and may as well comprise plotting, an uncertainty range as a function of at least a parameter relative to the wellbore.

The estimation of a correction may comprise at least one of the following:
  Modelling a current measured by the tool as a function of dip, optionally in function of at least one parameter or property relative to the wellbore, such as the mud resistivity,
  Modelling the measured current as a function of the fracture longitudinal extent, optionally in function of at least one parameter or property relative to the wellbore, such as the formation resistivity,
  Setting at least a maximal error for the resistivity of the formation and calculating a variation of the measured current and/or fracture in view of the maximal error, optionally in function of at least one parameter or property relative to the wellbore, such as the formation resistivity,
  Modelling a plurality of fluid fill patterns for a fracture and calculating a variation of fracture aperture in view of the plurality of fluid patterns, optionally in function of at least one parameter or property relative to the wellbore, such as the mud resistivity,
  Determining a minimum fracture aperture that may be detected by the tool in view of at least a parameter relative to the tool, such as the tool noise, optionally in function of at least one parameter or property relative to the wellbore, such as the mud resistivity or the formation resistivity.

The determination of uncertainty range may be a real-time determination.

The determination of uncertainty range may comprise plotting the uncertainty range associated to the wellbore as a function of depth.

The method may comprise calculating a corrected fracture aperture in view of the estimated correction(s).

The method may also comprise taking a drilling, completion or cementing action in view of the fracture aperture and the uncertainty range such as including an additive in the mud or in the cement or determining a perforation or completion plan.

The disclosure also relates to an apparatus for determining a fracture aperture of at least a fracture aperture in a wellbore, comprising:

A downhole tool comprising a resistivity sensor for measuring a resistivity of the wellbore and obtaining an image of the wellbore, A processing system, and configured to:
  i. Detect at least a fracture in a wellbore,
  ii. Calculate a fracture aperture of the detected fracture according to a predetermined model of the wellbore, the model being set up based on at least an hypothesis relative to the configuration of the wellbore,
  iii. Estimate a correction to the predetermined model when at least one of the hypothesis is not met,
  iv. Based on at least a measured parameter relative to the tool or the borehole and on the correction, determine an uncertainty range for the fracture aperture.

The downhole tool may be a LWD or a wireline tool.

The processing system may be able to detect any operation of the method disclosed hereinabove.

The invention claimed is:

1. A method for determining a fracture aperture of at least a fracture in a wellbore, wherein the method comprises:
   Measuring a resistivity of the wellbore with a downhole tool in a wellbore for obtaining an image of the wellbore,
   Detecting at least a fracture in the wellbore,
   Calculating a fracture aperture of the detected fracture according to a predetermined model of the wellbore, the model being set up based on at least an hypothesis relative to the configuration of the wellbore,
   Estimating a first correction to the predetermined model when a first hypothesis is not met,
   Estimating a second correction to the predetermined model when a second hypothesis is not met,
   Based on at least a measured parameter relative to the wellbore and on the first and second corrections, determining an uncertainty range for the fracture aperture
   taking a drilling, completion or cementing action in view of the fracture aperture and the uncertainty range.

2. The method according to claim 1, wherein the fracture aperture is calculated on the basis of the following equation:

$$W = c \cdot A \cdot R_m^b \cdot R_{xo}^{1-b} \quad (1)$$

Where:
  W=fracture aperture (mm);
  A=excess current (μA mm/V);
  $R_m$=mud resistivity (ohm·m);
  $R_{xo}$=background formation resistivity (ohm·m);
  b and c are parameters relative to the tool.

3. The method according to claim 1, wherein at least an hypothesis is the following:
   The response of the tool is due to a single fracture;
   Fractures are perpendicular to the wellbore;
   Fractures are of infinite length and constant width;
   Fractures are filled with one fluid of known resistivity;
   Scaling of imaging tool response to resistivity is valid;
   Formation is of uniform material.

4. The method according to claim 1, comprising determining at least a property relative to the wellbore based on the measured parameters, and obtaining the uncertainty on the basis of at least one of the property.

5. The method according to claim 4, wherein the parameter and/or property comprise at least one of the following:
   Standoff of the tool relative to the wellbore,
   Dip of the fracture,
   Longitudinal extent of the fracture,
   Resistivity of the drilling fluid,
   Resistivity of formation,
   Density or particle size range of the drilling fluid.

6. The method according to claim 1, wherein determining the uncertainty range is based on the calculated fracture aperture.

7. The method according to claim 1, wherein estimating the first or second correction comprises at least one of the following:
   Modelling a response of the tool or a configuration of the formation,
   The model of the wellbore being based on at least a variable relative to the wellbore, setting a maximal error for a variable.

8. The method according to claim 1, wherein estimating the first or second correction comprises estimating an uncertainty range as a function of at least a parameter relative to the wellbore.

9. The method according to claim 1, wherein estimating the first or second correction comprises at least one of the following:
   Modelling a current measured by the tool as a function of dip,
   Modelling the measured current as a function of the fracture longitudinal extent,
   Setting at least a maximal error for the resistivity of the formation and calculating a variation of the measured current and/or fracture in view of the maximal error,
   Modelling a plurality of fluid fill patterns for a fracture and calculating a variation of fracture aperture in view of the plurality of fluid patterns
   determining a minimum fracture aperture that may be detected by the tool in view of at least a parameter relative to the tool.

10. The method according to claim 9, wherein at least one of the modelling of the current by the tool as a function of the dip, the modelling of the measured current as a function of the fracture longitudinal extent, the setting the maximal error of the resistivity of the formation, the modelling of plurality of fluid fill patterns and the determining a minimum fracture aperture that may be detected is performed in function of at least one parameter or property relative to the wellbore.

11. The method according to claim 10, wherein the at least one parameter or property relative to the wellbore is a mud resistivity or a formation resistivity.

12. The method according to claim 1, wherein the determination of uncertainty range is a real-time determination.

13. The method according to claim 1, wherein the determination of uncertainty range comprises plotting the uncertainty range associated to the wellbore as a function of depth.

14. The method according to claim 1, comprising calculating a corrected fracture aperture in view of the estimated first and second corrections.

15. The method of claim 1, wherein taking a drilling, completion or cementing action comprises at least one of including an additive in the mud or in the cement or determining a perforation or completion plan.

16. An apparatus for determining a fracture aperture of at least a fracture in a wellbore, comprising:
   A downhole tool comprising a resistivity sensor for measuring a resistivity of the wellbore and obtaining an image of the wellbore,
   A processing system, and configured to:
      i. Detect at least a fracture in a wellbore,
      ii. Calculate a fracture aperture of the detected fracture according to a predetermined model of the wellbore, the model being set up based on at least an hypothesis relative to the configuration of the wellbore,
      iii. Estimate a first correction to the predetermined model when a first hypothesis is not met,
      iv. Estimate a second correction to the predetermined model when a second hypothesis is not met,
      v. Based on at least a measured parameter relative to the tool or the borehole and on the first and second corrections, determine an uncertainty range for the fracture aperture,
      vi. Take a specific drilling, completion or cementing action in view of the fracture aperture and the uncertainty range.

17. The apparatus according to claim 16, wherein the downhole tool is a LWD or a wireline tool.

* * * * *